United States Patent
Sawa et al.

(10) Patent No.: US 10,415,695 B2
(45) Date of Patent: Sep. 17, 2019

(54) RANGE DETERMINATION DEVICE FOR AUTOMATIC TRANSMISSION

(71) Applicant: MAZDA MOTOR CORPORATION, Hiroshima (JP)

(72) Inventors: Kenji Sawa, Hiroshima (JP); Takahiro Kimura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 399 days.

(21) Appl. No.: 15/386,030

(22) Filed: Dec. 21, 2016

(65) Prior Publication Data

US 2017/0198807 A1    Jul. 13, 2017

(30) Foreign Application Priority Data

Jan. 8, 2016   (JP) .................................. 2016-002496

(51) Int. Cl.
*F16H 59/68*   (2006.01)
*F16H 59/36*   (2006.01)
(Continued)

(52) U.S. Cl.
CPC ............. *F16H 59/68* (2013.01); *F16H 59/36* (2013.01); *F16H 59/44* (2013.01); *F16H 59/54* (2013.01);
(Continued)

(58) Field of Classification Search
None
See application file for complete search history.

(56) References Cited

U.S. PATENT DOCUMENTS

| 5,749,802 A | * | 5/1998 | Tanahashi | ........... F16H 61/0437 |
| | | | | 475/120 |
| 5,810,694 A | * | 9/1998 | Kamada | ............. F16H 61/0021 |
| | | | | 477/117 |

(Continued)

FOREIGN PATENT DOCUMENTS

| CN | 101160482 A | 4/2008 |
| CN | 101324270 A | 12/2008 |

(Continued)

OTHER PUBLICATIONS

An Office Action issued by the Chinese Patent Office dated Apr. 3, 2018, which corresponds to Chinese Patent Application No. 201611243638.3 and is related to U.S. Appl. No. 15/386,030; with an English summary.

(Continued)

*Primary Examiner* — Jacob S. Scott
(74) *Attorney, Agent, or Firm* — Studebaker & Brackett PC

(57) ABSTRACT

A range determination device is applied to an automatic transmission provided with an input portion, an output portion, and a range switching mechanism which transmits rotation of the input portion to the output portion, and which is operative to switch the range of the automatic transmission between a forward range and a reverse range, in which directions of transmitting rotation from the input portion to the output portion are different from each other. The range determination device includes a rotational state detection unit which detects a rotational state of a predetermined rotary member included in the range switching mechanism, and a determination unit which determines that the forward range or the reverse range is attained on the basis of the rotational state of the rotary member detected by the rotational state detection unit.

11 Claims, 9 Drawing Sheets

(51) Int. Cl.
*F16H 59/44* (2006.01)
*F16H 61/30* (2006.01)
*F16H 59/54* (2006.01)
*F16H 61/36* (2006.01)
*F16H 3/66* (2006.01)
*F16H 59/70* (2006.01)

(52) U.S. Cl.
CPC ............ *F16H 61/30* (2013.01); *F16H 61/36* (2013.01); *F16H 3/663* (2013.01); *F16H 2059/443* (2013.01); *F16H 2059/683* (2013.01); *F16H 2059/6807* (2013.01); *F16H 2059/6823* (2013.01); *F16H 2059/708* (2013.01); *F16H 2200/006* (2013.01); *F16H 2200/2012* (2013.01); *F16H 2200/2043* (2013.01)

(56) References Cited

U.S. PATENT DOCUMENTS

| | | | |
|---|---|---|---|
| 5,887,483 A * | 3/1999 | Ohashi | F16H 61/0246 477/116 |
| 6,863,639 B1 * | 3/2005 | Inoue | F16H 61/16 477/116 |
| 2004/0053743 A1 | 3/2004 | Tsuzuki et al. | |
| 2008/0182698 A1 * | 7/2008 | Matsubara | B60W 30/19 475/151 |
| 2008/0215218 A1 | 9/2008 | Watanabe et al. | |
| 2008/0312035 A1 | 12/2008 | Murayama et al. | |
| 2009/0042691 A1 | 2/2009 | Matsubara et al. | |
| 2011/0112736 A1 | 5/2011 | Nakade et al. | |
| 2011/0238275 A1 | 9/2011 | Watanabe et al. | |

FOREIGN PATENT DOCUMENTS

| | | |
|---|---|---|
| JP | S60-119652 U | 8/1985 |
| JP | S61-1378150 U | 8/1986 |
| JP | H03-213769 A | 9/1991 |
| JP | 2004-052819 A | 2/2004 |
| JP | 2004-232732 A | 8/2004 |
| JP | 2009-006829 A | 1/2009 |
| JP | 2009-041629 A | 2/2009 |
| JP | 2009-243615 A | 10/2009 |
| JP | 2010-216561 A | 9/2010 |
| JP | 2011-149486 A | 8/2011 |
| WO | 2010/007957 A1 | 1/2010 |

OTHER PUBLICATIONS

An Office Action; "Notification of Reasons for Refusal" issued by the Japanese Patent Office dated Oct. 24, 2017, which corresponds to Japanese Patent Application No. 2016-002496 and is related to U.S. Appl. No. 15/386,030; with English Concise Explanation.

* cited by examiner

FIG.2

|   |   | CL1 | CL2 | CL3 | BR1 | BR2 | PARKING LOCK |
|---|---|---|---|---|---|---|---|
|  | P |  |  |  | ○ | ○ | ○ |
|  | N |  |  |  | ○ | ○ |  |
| D | 1ST GEAR POSITION | ○ |  |  | ○ | ○(△) |  |
|  | 2ND GEAR POSITION |  | ○ |  | ○ | ○ |  |
|  | 3RD GEAR POSITION | ○ | ○ |  |  | ○ |  |
|  | 4TH GEAR POSITION |  | ○ | ○ |  | ○ |  |
|  | 5TH GEAR POSITION | ○ |  | ○ |  | ○ |  |
|  | 6TH GEAR POSITION | ○ | ○ | ○ |  |  |  |
|  | 7TH GEAR POSITION | ○ |  | ○ | ○ |  |  |
|  | 8TH GEAR POSITION |  | ○ | ○ | ○ |  |  |
|  | R |  |  | ○ | ○ | ○(△) |  |

(FIRST GEAR POSITION IN D-RANGE)

RANGE DETERMINATION DEVICE FOR AUTOMATIC TRANSMISSION

FIELD OF THE INVENTION

The present invention relates to a technique for determining a range of an automatic transmission including an input portion and an output portion, and a range switching mechanism which transmits rotation of the input portion to the output portion, and which is operative to switch the range of the automatic transmission between a forward range and a reverse range, in which directions of transmitting rotation from the input portion to the output portion are different from each other.

BACKGROUND ART

Generally, an automatic transmission includes a plurality of planetary gear sets, and a plurality of hydraulically driven frictional engagement elements (clutches and brakes) for switching a power transmission path by each of the planetary gear sets. Further, various ranges such as a forward range and a reverse range are attained by selective engagement of a specific one of the frictional engagement elements.

In particular, in an automatic transmission to be mounted in a vehicle, in view of the aspect of securing vehicular safety, it is required to determine a range of the automatic transmission on the basis of an actual state within the automatic transmission. For instance, in Japanese Unexamined Patent Publication No. 2004-232732, a currently attained range of an automatic transmission is determined on the basis of a hydraulic pattern to be supplied to each of the frictional engagement elements of the automatic transmission.

In an actual automatic transmission, however, a frictional engagement element may not be operated as intended by a hydraulic pattern due to a defect of a hydraulic circuit or a frictional engagement element. In this case, if a range is determined on the basis of hydraulic pattern of a frictional engagement element as disclosed in Japanese Unexamined Patent Publication No. 2004-232732, it may be impossible to handle the aforementioned matter, and the range may be erroneously determined. In particular, a forward range and a reverse range have such a relationship that the rotational directions of an output shaft are opposite to each other. Therefore, the influence when the range is erroneously determined is serious, and careful determination is required.

SUMMARY OF THE INVENTION

In view of the above, an object of the present invention is to provide a range determination device for an automatic transmission, which enables to increase the precision in determining a forward range or a reverse range.

An aspect of the present invention is directed to a range determination device configured to determine a range of an automatic transmission provided with an input portion, an output portion, and a range switching mechanism which transmits rotation of the input portion to the output portion, and which is operative to switch the range of the automatic transmission between a forward range and a reverse range, in which directions of transmitting rotation from the input portion to the output portion are different from each other. The range determination device includes a rotational state detection unit which detects a rotational state of a predetermined rotary member included in the range switching mechanism; and a determination unit which determines that the forward range or the reverse range is attained on the basis of the rotational state of the rotary member detected by the rotational state detection unit.

These and other objects, features and advantages of the present invention will become more apparent upon reading the following detailed description along with the accompanying drawings.

BRIEF DESCRIPTION OF THE DRAWINGS

FIG. 2 is an engagement table illustrating a correlation between combination of engagement and release of frictional engagement elements, and ranges (or gear positions) of the automatic transmission;

DESCRIPTION OF EMBODIMENTS

Figure 1:
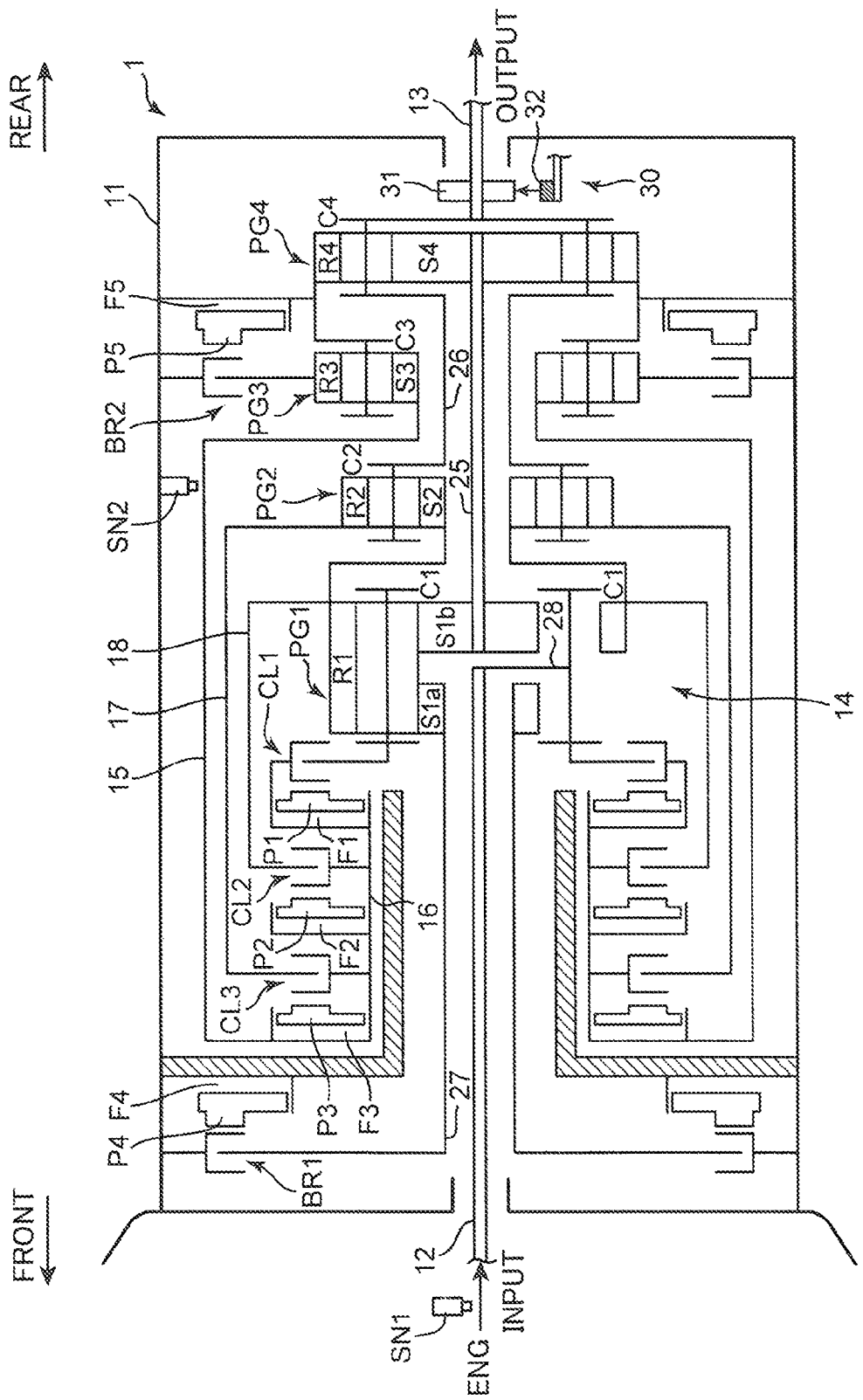
FIG. 1 is a conceptual diagram schematically illustrating an overall configuration of an automatic transmission according to an embodiment of the present invention.

In the following, a preferred embodiment of an automatic transmission to which a range determination device of the present invention is applied is described in detail referring to the drawings.

(1) Overall Configuration of Automatic Transmission

FIG. 1 is a conceptual diagram schematically illustrating an overall configuration of an automatic transmission 1 according to an embodiment of the present invention. The automatic transmission 1 is mounted in a vehicle such as an automobile for transmitting a driving force to be input from an engine (not illustrated) as a power source to wheels while shifting a gear position. Specifically, the automatic transmission 1 includes an input shaft 12 (corresponding to an input portion in the claims), which is driven to rotate by the engine, an output shaft 13 (corresponding to an output portion in the claims) coaxially disposed with the input shaft 12 on the side opposite to the engine, a transmission mechanism 14 (corresponding to a range switching mechanism in the claims) which transmits rotation of the input shaft 12 to the output shaft 13, and a transmission case 11 which accommodates the transmission mechanism 14.

The input shaft 12 is directly (mechanically) connected to the engine. A torque converter is not provided between the input shaft 12 and the engine. Specifically, in a vehicular automatic transmission, it is often the case that a torque converter as a power transmission device using fluid is disposed between an engine and an input shaft. In the embodiment, however, such a torque converter is abolished, and an output of the engine is directly transmitted to the input shaft 12.

In the embodiment, the automatic transmission 1 is disposed in a longitudinal posture such that the input shaft 12 is located on the vehicle front side, and the output shaft 13 is located on the vehicle rear side. Therefore, in the following, an engine side (the left side in the drawings) may be referred to as the front side, and the side opposite to the engine side (the right side in the drawings) may be referred to as the rear side.

The transmission mechanism 14 includes a first planetary gear set PG1, a second planetary gear set PG2, a third planetary gear set PG3, and a fourth planetary gear set PG4. Hereinafter, the planetary gear sets are simply referred to as gear sets. These gear sets PG1, PG2, PG3, and PG4 are disposed in this order from the front side (from the engine side) along the axes of the input shaft 12 and the output shaft 13.

Further, the transmission mechanism 14 include a first clutch CL1, a second clutch CL2, a third clutch CL3, a first brake BR1, and a second brake BR2 as frictional engagement elements for switching a power transmission path by each of the gear sets PG1 to PG4.

The frictional engagement elements (CL1, CL2, CL3; BR1, BR2) are disposed in the order of the first brake BR1, the third clutch CL3, the second clutch CL2, the first clutch CL1, and the second brake BR2 from the front side (from the engine side) along the axes of the input shaft 12 and the output shaft 13. Specifically, the first clutch CL1 is disposed on the front side of the first gear set PG1, the second clutch CL2 is disposed on the front side of the first clutch CL1, and the third clutch CL3 is disposed on the front side of the second clutch CL2 within the transmission case 11. Further, the first brake BR1 is disposed on the front side of the third clutch CL3, and the second brake BR2 is disposed on the radially outer side of the third gear set PG3.

In the embodiment, any one of the first to fourth gear sets PG1 to PG4 is a single pinion type planetary gear set configured such that a pinion supported on a carrier directly meshes with a sun gear and a ring gear. Specifically, the first gear set PG1 includes a first sun gear S1, a first ring gear R1, and a first carrier C1. The second gear set PG2 includes a second sun gear S2, a second ring gear R2, and a second carrier C2. The third gear set PG3 includes a third sun gear S3, a third ring gear R3, and a third carrier C3. The fourth gear set PG4 includes a fourth sun gear S4, a fourth ring gear R4, and a fourth carrier C4.

Further, the first gear set PG1 is a double sun gear type planetary gear set in which the first sun gear S1 is divided into two parts in the axial direction. Specifically, the first sun gear S1 includes a front-side first sun gear S1a disposed on the front side in the axial direction, and a rear-side first sun gear S1b disposed on the rear side in the axial direction. The paired first sun gears S1a and S1b have the same number of teeth, and mesh with a same pinion supported on the first carrier C1. Therefore, the rotation numbers of the first sun gears S1a and S1b are always equal to each other. In other words, the paired front-side and rear-side first sun gears S1a and S1b are always rotated with a same speed. When rotation of one of the paired front-side and rear-side first sun gears S1a and S1b is stopped, rotation of the other of the paired front-side and rear-side first sun gears S1a and S1b is also stopped. Note that in the embodiment, each of the gear sets (namely, the second to fourth gear sets PG2 to PG4) other than the first gear set PG1 is not of the double sun gear type, and has a single sun gear.

The first sun gear S1 (more specifically, the rear-side first sun gear S1b) and the fourth sun gear S4 are always connected to each other. The first ring gear R1 and the second sun gear S2 are always connected to each other. The second carrier C2 and the fourth carrier C4 are always connected to each other. The third carrier C3 and the fourth ring gear R4 are always connected to each other. Further, the input shaft 12 is always connected to the first carrier C1, and the output shaft 13 is always connected to the fourth carrier C4.

Specifically, the rear-side first sun gear S1b and the fourth sun gear S4 are connected to each other via a power transmission member 25, and the fourth carrier C4 and the second carrier C2 are connected to each other via a power transmission member 26. The input shaft 12 is connected to the first carrier C1 via a power transmission member 28 which passes through between the paired front-side and rear-side first sun gears S1a and S1b.

The first clutch CL1 disconnectably connects between the input shaft 12 and the first carrier C1, and the third sun gear S3. The second clutch CL2 disconnectably connects between the first ring gear R1 and the second sun gear S2, and the third sun gear S3. The third clutch CL3 disconnectably connects between the second ring gear R2 and the third sun gear S3.

Although detailed illustration is omitted, the first clutch CL1 has the same structure as a conventionally known wet-type multi-plate clutch. The first clutch CL1 includes a hub member rotatably connected to the first clutch C1, a hub-side friction plate engaged with the outer surface of the hub member, a drum member rotatably connected to the third sun gear S3 via power transmission members 15 and 16, a drum-side friction plate engaged with the inner surface of the drum member, and a piston P1 which is reciprocatively driven in the axial direction so that the hub-side friction plate and the drum-side friction plate are brought into press contact with each other. A hydraulic chamber F1 to which hydraulic oil (corresponding to a hydraulic medium in the claims) to be supplied from a hydraulic circuit 40 to be described later is introduced is defined adjacent to the piston P1. The hub-side friction plate and the drum-side friction plate are brought into press contact with each other, or press contact between the hub-side friction plate and the drum-side friction plate is released according to supply or discharge of hydraulic oil with respect to the hydraulic chamber F1. Further, the hub member and the drum member are connected to each other or disconnected from each other when the hub-side friction plate and the drum-side friction plate are brought into press contact with each other, or press contact between the hub-side friction plate and the drum-side friction plate is released. Furthermore, the input shaft 12 and the first carrier C1, and the third sun gear S3 are connected to each other or disconnected from each other, as the hub-side friction plate and the drum-side friction plate are connected to each other or disconnected from each other. Note that the power transmission member 15 connected to the third sun gear S3 corresponds to a predetermined rotary member in the claims.

Likewise, the second clutch CL2 includes a hub member rotatably connected to the third sun gear S3 via the power transmission members 15 and 16, a hub-side friction plate engaged with the outer surface of the hub member, a drum member rotatably connected to the first ring gear R1 and the second sun gear S2 via a power transmission member 18, a drum-side friction plate engaged with the inner surface of the drum member, and a piston P2 which is reciprocatively driven so that the hub-side friction plate and the drum-side friction plate are brought into press contact with each other. A hydraulic chamber F2 to which the hydraulic oil is introduced is defined adjacent to the piston P2. The first ring gear R1 and the second sun gear S2, and the third sun gear S3 are connected to each other or disconnected from each other when the hub-side friction plate and the drum-side friction plate are brought into press contact with each other, or press contact between the hub-side friction plate and the drum-side friction plate is released according to supply or discharge of hydraulic oil with respect to the hydraulic chamber F2.

The third clutch CL3 includes a hub member rotatably connected to the third sun gear S3 via the power transmission members 15 and 16, a hub-side friction plate engaged with the outer surface of the hub member, a drum member rotatably connected to the second ring gear R2 via a power transmission member 17, a drum-side friction plate engaged with the inner surface of the drum member, and a piston P3 which is reciprocatively driven so that the hub-side friction plate and the drum-side friction plate are brought into press contact with each other. A hydraulic chamber F3 to which the hydraulic oil is introduced is defined adjacent to the piston P3. The second ring gear R2 and the third sun gear S3 are connected to each other or disconnected from each other when the hub-side friction plate and the drum-side friction plate are brought into press contact with each other, or press contact between the hub-side friction plate and the drum-side friction plate is released according to supply or discharge of hydraulic oil with respect to the hydraulic chamber F3.

The first brake BR1 disconnectably connects between the transmission case 11 and the first sun gear S1 (more specifically, the front-side first sun gear S1$a$). The second brake BR2 disconnectably connects between the transmission case 11 and the third ring gear R3.

Although detailed illustration is omitted, the first brake BR1 has the same structure as a conventionally known wet-type multi-plate clutch. The first brake BR1 includes a hub member rotatably connected to the front-side first sun gear S1$a$ via a power transmission member 27, a hub-side friction plate engaged with the outer surface of the hub member, a case-side friction plate engaged with the inner surface of the transmission case 11, and a piston P4 which is reciprocatively driven in the axial direction so that the hub-side friction plate and the case-side friction plate are brought into press contact with each other. A hydraulic chamber F4 to which the hydraulic oil is introduced is defined adjacent to the piston P4. The transmission case 11 and the first sun gear S1 are connected to each other or disconnected from each other when the hub-side friction plate and the case-side friction plate are brought into press contact with each other, or press contact between the hub-side friction plate and the case-side friction plate is released according to supply or discharge of hydraulic oil with respect to the hydraulic chamber F4.

Likewise, the second brake BR2 includes a hub member rotatably connected to the third ring gear R3, a hub-side friction plate engaged with the outer surface of the hub member, a case-side friction plate engaged with the inner surface of the transmission case 11, and a piston P5 which is reciprocatively driven in the axial direction so that the hub-side friction plate and the case-side friction plate are brought into press contact with each other. A hydraulic chamber F5 to which the hydraulic oil is introduced is defined adjacent to the piston P5. The transmission case 11 and the third ring gear R3 are connected to each other or disconnected from each other when the hub-side friction plate and the case-side friction plate are brought into press contact with each other, or press contact between the hub-side friction plate and the case-side friction plate is released according to supply or discharge of hydraulic oil with respect to the hydraulic chamber F5.

An input rotation sensor SN1 for detecting a rotational speed of the input shaft 12 is provided between the engine and the automatic transmission 1. Further, an internal rotation sensor SN2 for detecting a rotational direction of the power transmission member 15 is provided on the inner surface of the transmission case 11 and at a position radially facing a rear portion of the power transmission member 15. The internal rotation sensor SN2 corresponds to a rotational state detection unit in the claims.

A parking lock mechanism 30 for restricting rotation of the output shaft 13 is provided within the transmission case 11. The parking lock mechanism 30 includes a parking gear 31 which is mounted on the output shaft 13 in such a manner that the parking gear 31 is integrally rotated with the output shaft 13, a lock lever 32 mounted on the radially outer side of the parking gear 31 in such a manner that the lock lever 32 is disconnectably connectable to the parking gear 31, and a hydraulic actuator (not illustrated) which drives the lock lever 32.

In the automatic transmission 1 having the aforementioned configuration in the first embodiment, as illustrated in the engagement table of FIG. 2, one of the P-range (parking range), the N-range (neutral range), the D-range (forward range), and the R-range (reverse range) is attained by selective engagement of a specific one of the five frictional engagement elements (CL1, CL2, CL3; BR1, BR2) or by switching between activation and deactivation of the parking lock mechanism 30. Further, when the automatic transmission 1 is in the D-range, one of the first to eighth gear positions is selectable. Note that a block with the symbol "o" in the table of FIG. 2 denotes that the associated clutch or brake is in an engagement state, or that the parking lock mechanism 30 is in an operative state. On the other hand, a block without the symbol "o" denotes that the associated clutch or brake is in a released state or that the parking lock mechanism 30 is in an inoperative state.

When the automatic transmission 1 is in the P-range, the first brake BR1 and the second brake BR2 are engaged, and the parking lock mechanism 30 is driven. In this state, rotation of the input shaft 12 is not transmitted to the output shaft 13, and the output shaft 13 is locked (in other words, traveling of a vehicle is prohibited).

When the automatic transmission 1 is in the N-range, the first brake BR1 and the second brake BR2 are engaged. In this state, rotation of the input shaft 12 is not transmitted to the output shaft 13 as well as when the automatic transmission 1 is in the P-range. However, unlike a state in which the automatic transmission 1 is in the P-range, the parking lock mechanism 30 is deactivated, and the output shaft 13 is not locked.

When the automatic transmission 1 is in the D-range, one of the first to eighth gear positions is attained by engagement of specific three frictional engagement elements selected from the clutches CL1, CL2, CL3, and the brakes BR1, BR2. Specifically, in the first gear position, the first clutch CL1, the first brake BR1 and the second brake BR2 are engaged; in the second gear position, the second clutch CL2, the first brake BR1 and the second brake BR2 are engaged; in the third gear position, the first clutch CL1, the second clutch CL2, and the second brake BR2 are engaged; in the fourth gear position, the second clutch CL2, the third clutch CL3, and the second brake BR2 are engaged; in the fifth gear position, the first clutch CL1, the third clutch CL3, and the second brake BR2 are engaged; in the sixth gear position, the first clutch CL1, the second clutch CL2, and the third clutch CL3 are engaged; in the seventh gear position, the first clutch CL1, the third clutch CL3, and the first brake BR1 are engaged; and in the eighth gear position, the second clutch CL2, the third clutch CL3, and the first brake BR1 are engaged. Rotation of the input shaft 12 is transmitted to the output shaft 13 after the rotational speed is changed (reduced or increased) with a gear ratio associated with one of the first to eighth gear positions, and the output shaft 13 is driven to rotate in a direction for driving a vehicle in a forward direction.

When the automatic transmission 1 is in the R-range, the third clutch CL3, the first brake BR1, and the second brake BR2 are engaged. In this case, rotation of the input shaft 12 is transmitted to the output shaft 13 in a direction opposite to the direction when the automatic transmission 1 is in the D-range, and the output shaft 13 is driven to rotate in a direction for driving a vehicle in a backward direction.

Note that in the engagement table of FIG. 2, the block of the second brake BR2 when the automatic transmission 1 is in the first gear position in the D-range and the block of the second brake BR2 when the automatic transmission 1 is in the R-range, which are attached with the symbol "Δ" in addition to the symbol "o", denote that slip control is performed with respect to the second brake BR2 when a vehicle is stopped. Specifically, in the embodiment, a torque converter is not provided between the automatic transmission 1 and the engine, and the input shaft 12 of the automatic transmission 1 is directly connected to the engine. Therefore, if all the frictional engagement elements that are inherently necessary to be engaged in order to attain the first gear position in the D-range or the R-range are engaged when a vehicle is stopped in a state that the first gear position in the D-range or the R-range is selected, the engine may stop (the engine may stall). In view of the above, performing slip control with respect to the second brake BR2 when a vehicle is started or stopped makes it possible to prevent that an engine may stall as described above. Note that slip control is an operation of incompletely engaging between friction plates for transmitting a small amount of torque while allowing relative rotation between friction plates.

In this way, in the embodiment, since a torque converter is abolished, control with respect to the second brake BR2 is different between a state that a vehicle is stopped and a state that a vehicle is traveling (in other words, the second brake BR2 may be engaged, or slip control may be performed with respect to the second brake BR2) when the automatic transmission 1 is in the first gear position of the D-range and in the R-range, which are selected when the vehicle is started (when the vehicle is started in a forward direction and when the vehicle is started in a backward direction). In the following, it is assumed that the first gear position in the D-range or the R-range is attached in any of the conditions. For instance, when the automatic transmission 1 is in the R-range, even if slip control is performed with respect to the second brake BR2 when a vehicle is stopped, as far as the third clutch CL3 and the first brake BR1 are engaged, it is regarded that the R-range is attained. On the other hand, when a vehicle is traveling, a state that all the three frictional engagement elements i.e. the third clutch CL3, the first brake BR1, and the second brake BR2 are engaged is regarded as a state that the R-range is attained. This idea is also applied to a case when the automatic transmission 1 is in the first gear position in the D-range.

Figure 3:
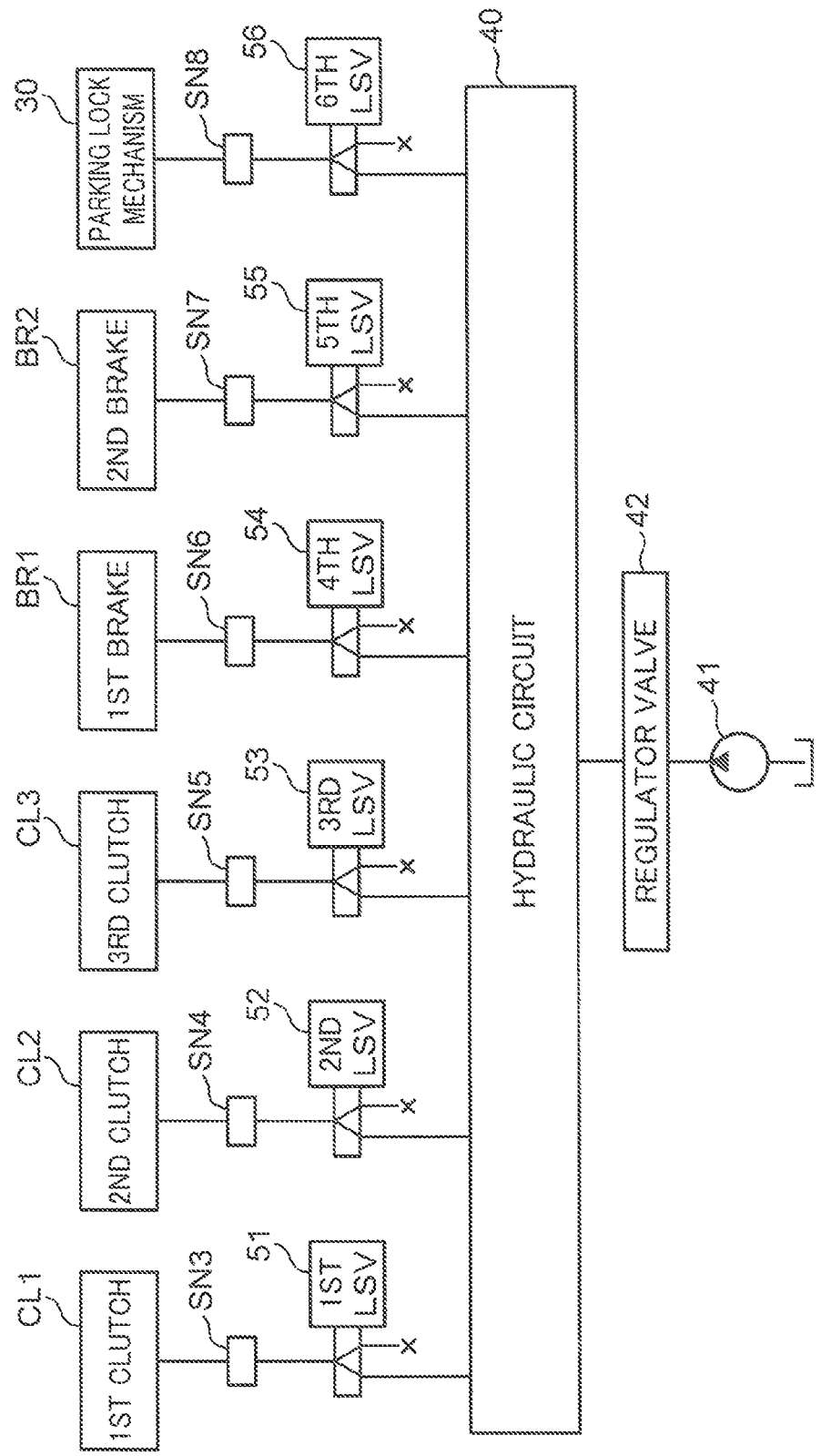
FIG. 3 is a block diagram illustrating hydraulic oil supply passages within the automatic transmission.

FIG. 3 is a block diagram illustrating hydraulic oil supply passages within the automatic transmission 1. As illustrated in FIG. 3, the automatic transmission 1 includes an oil pump 41 which supplies hydraulic oil; a regulator valve 42 which adjusts a discharge pressure of hydraulic oil by the oil pump 41 and generates a line pressure; first to sixth linear solenoid valves 51 to 56 (hereinafter, linear solenoid valves are abbreviated as LSVs) which selectively supply hydraulic oil introduced through the regulator valve 42 to the clutches CL1 to CL3, and the brakes BR1 and BR2 and to an actuator of the parking lock mechanism 30; and the hydraulic circuit 40 constituted by various valves and oil passages provided between the first to sixth LSVs 51 to 56 and the regulator valve 42. Further, hydraulic pressure sensors SN3, SN4, SN5, SN6, SN7, and SN8 which detect hydraulic pressures of hydraulic oil (exit pressures of the LSVs 51 to 56) to be supplied to the clutches CL1 to CL3 and the brakes BR1 and BR2 and to the parking lock mechanism 30 are disposed on the downstream side of the first to sixth LSVs 51 to 56. Note that the hydraulic pressure sensors SN3 to SN8 correspond to a pressure detection unit in the claims.

Figure 4:
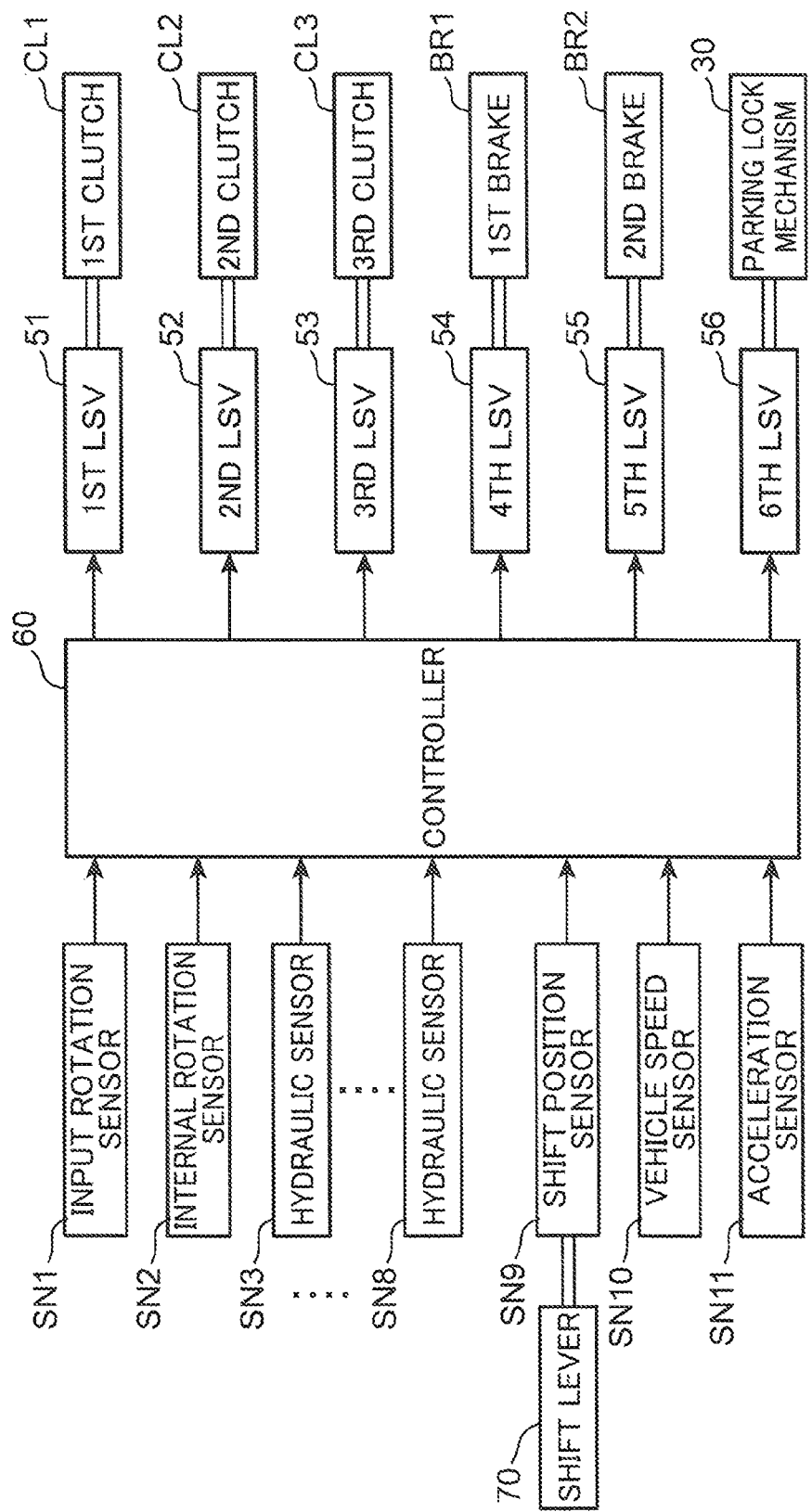
FIG. 4 is a block diagram illustrating a control system of the automatic transmission.

FIG. 4 is a block diagram illustrating a control system of the automatic transmission 1 in the embodiment. A controller 60 illustrated in FIG. 4 is constituted by a well-known microcomputer including a CPU, an RAM, and an ROM. The controller 60 has a function of controlling the automatic transmission 1 according to a range selecting operation by the driver (a driver's operation with respect to a shift lever 70 to be described later), and a traveling state of a vehicle. Note that the controller 60 corresponds to a determination unit in the claims.

Various detection signals from various sensors including the rotation sensors SN1 and SN2 and the hydraulic pressure sensors SN3 to SN8 are input to the controller 60. Specifically, a detection signal representing a rotational speed of the input shaft 12 is input from the input rotation sensor SN1 to the controller 60, and a detection signal representing a rotational direction of the power transmission member 15 is input from the internal rotation sensor SN2 to the controller 60. Further, detection signals representing hydraulic pressures to be supplied to the clutches CL1 to CL3 and to the brakes BR1 and BR2, and a detection signal representing a hydraulic pressure to be supplied to the actuator of the parking lock mechanism 30 are input from the hydraulic pressure sensors SN3 to SN8 to the controller 60.

In addition to the above, a shift position sensor SN9 which detects a position (shift position) of the shift lever 70 to be operated by the driver, a vehicle speed sensor SN10 which detects a traveling speed (vehicular speed) of a vehicle, and an acceleration sensor SN11 which detects an opening angle (accelerator opening angle) of an accelerator pedal provided in the vehicle are provided within the vehicle. Detection signals from the sensors SN9 to SN11 are also input to the controller 60, respectively.

The controller 60 integrally controls the automatic transmission 1 on the basis of information acquired from each of the sensors SN1 to SN11. For instance, the controller 60 is electrically connected to the first to sixth LSVs 51 to 56. Controlling opening and closing operations of the LSVs 51 to 56 makes it possible to switch engagement and release of the clutches CL1 to CL3 and the brakes BR1 and BR2, and to switch activation and deactivation of the parking lock mechanism 30. The automatic transmission 1 is controlled in such a manner that an appropriate range or gear position is selected according to a driver's operation of the shift lever 70 and a traveling state of a vehicle through these controls.

The embodiment employs a system called a shift-by-wire system, in which the automatic transmission 1 and the shift lever 70 are mechanically isolated from each other. Therefore, the range of the automatic transmission 1 is not mechanically switched in association with an operation of the shift lever 70, but is controllably switched by the controller 60 on the basis of an electrical signal to be input from the shift position sensor SN9.

In the automatic transmission 1 of the embodiment employing a shift-by-wire system as described above, a drawback that the position of the shift lever 70 and the actual range of the automatic transmission 1 do not coincide with each other due to some reason may occur. Therefore, in the embodiment, it is required to accurately grasp the actual range of the automatic transmission 1. In view of the above, the controller 60 executes the following determination control when the automatic transmission 1 is being operated (when an ignition switch of a vehicle is in an ON-state).

(2) Range Determination Control

Figure 5:
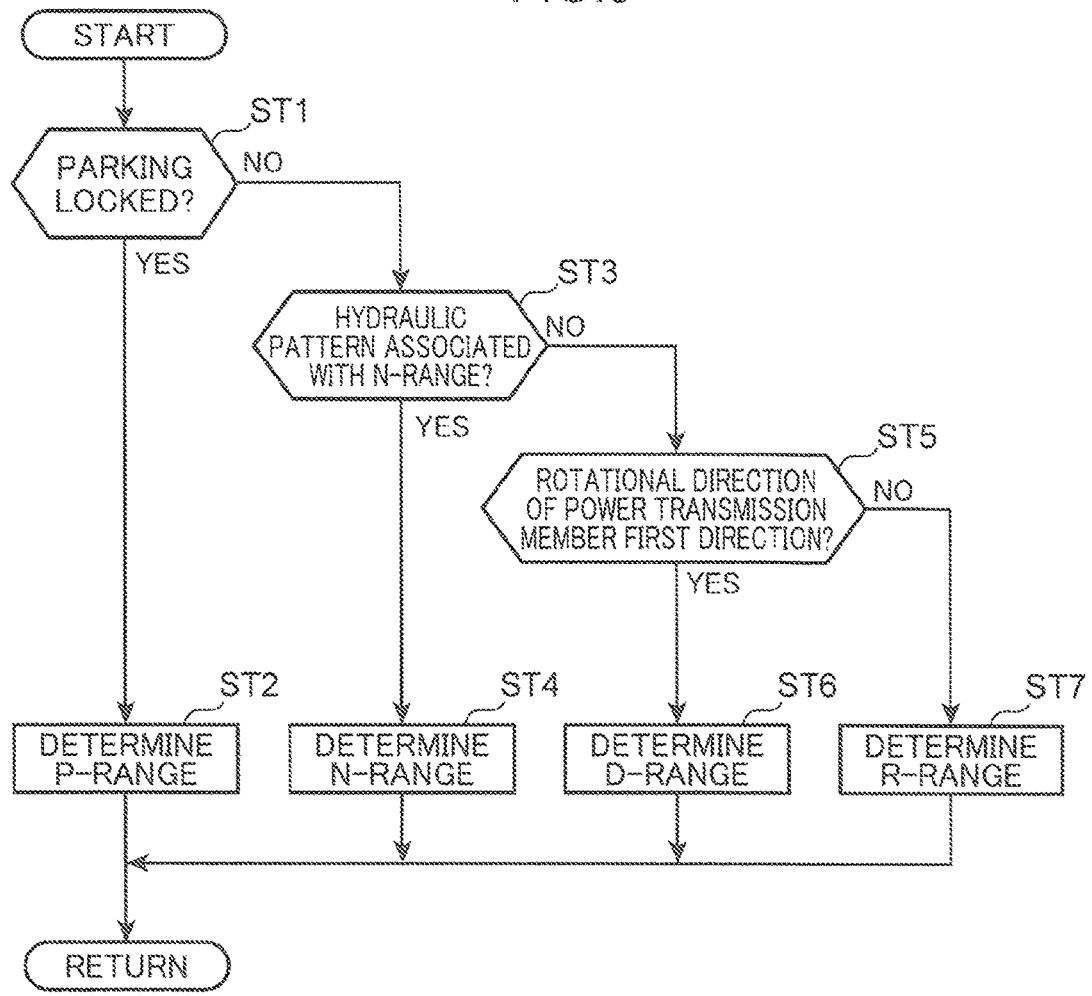
FIG. 5 is a flowchart illustrating a specific control example in which the range of the automatic transmission is determined.

FIG. 5 is a flowchart for determining which one of the ranges i.e. the P-range, the R-range, the N-range, and the D-range is attained as a current range of the automatic transmission 1. When the control illustrated in the flowchart is started, the controller 60 determines whether or not the actuator of the parking lock mechanism 30 is driven, in other words, whether or not the output shaft 13 of the automatic transmission 1 is locked on the basis of a detection value from the hydraulic pressure sensor SN8 which detects a hydraulic pressure to be supplied to the parking lock mechanism 30 (Step ST1).

When the determination result in Step ST1 is YES, and it is confirmed that the output shaft 13 is locked, the controller 60 determines that the P-range is attained as the range of the automatic transmission 1 (Step ST2).

On the other hand, when the determination result in Step ST1 is NO, and it is confirmed that the output shaft 13 is not locked, the controller 60 determines whether or not a hydraulic pattern associated with the N-range in which the first brake BR1 and the second brake BR2 are engaged is attained on the basis of detection values from the hydraulic pressure sensors SN3 to SN8 (Step ST3). Specifically, as illustrated in the table of FIG. 2, in the N-range, the first brake BR1 and the second brake BR2 are engaged, the first to third clutches CL1 to CL3 are released, and the parking lock mechanism 30 is deactivated. In Step ST3, it is determined whether or not a hydraulic pattern capable of implementing the aforementioned state is obtained on the basis of detection values from the hydraulic pressure sensors SN3 to SN8.

When the determination result in Step ST3 is YES, and it is confirmed that the hydraulic pattern is associated with the N-range, the controller 60 determines that the N-range is attained as the range of the automatic transmission 1 (Step ST4).

When the determination result in Step ST3 is NO, and it is confirmed that the hydraulic pattern is not associated with the N-range, in other words, when the current range is neither the P-range nor the N-range, the controller 60 determines whether or not the power transmission member 15 is rotated in a predetermined first direction on the basis of a detection value from the internal rotation sensor SN2 (Step ST5).

When the determination result in Step ST5 is YES, and it is confirmed that the power transmission member 15 is rotated in the first direction, the controller 60 determines that the D-range is attained as the range of the automatic transmission 1 (Step ST6).

On the other hand, when the determination result in Step ST5 is NO, and it is confirmed that the power transmission member 15 is not rotated in the first direction, in other words, it is confirmed that the power transmission member 15 is rotated in a second direction opposite to the first direction, the controller 60 determines that the R-range is attained as the range of the automatic transmission 1 (Step ST7).

The first direction to be used in the determination of Step ST5 is a direction in which the power transmission member 15 is rotated when it is assumed that the D-range is attained. Therefore, the first direction is a direction opposite to the rotational direction (second direction) of the power transmission member 15 when the R-range is attained. Specifically, in the automatic transmission 1 of the embodiment, as far as one of the D-range and the R-range is attained, the power transmission member 15 is rotated. However, the rotational directions of the power transmission member 15 are opposite between the D-range and the R-range. In view of the above, in Steps ST5 to ST7, assuming that the rotational direction of the power transmission member 15 when the D-range is attained is the first direction, and the rotational direction of the power transmission member 15 when the R-range is attained is the second direction, the D-range or the R-range is determined according to in which direction i.e. the first direction or the second direction, the power transmission member 15 is rotated.

Figure 8:
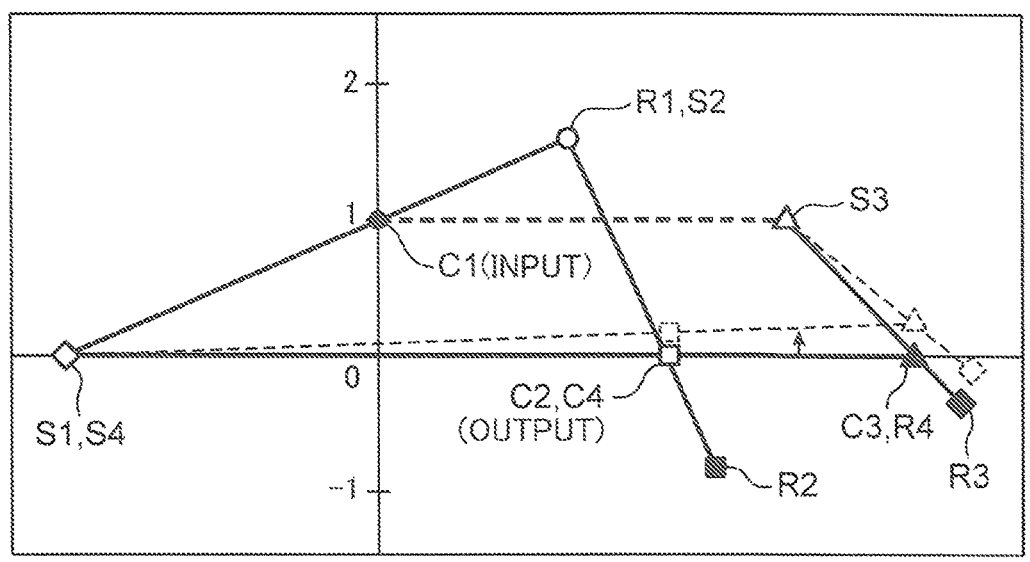
FIG. 8 is a velocity diagram of the automatic transmission when the first gear position in the D-range is attained.
Figure 9:
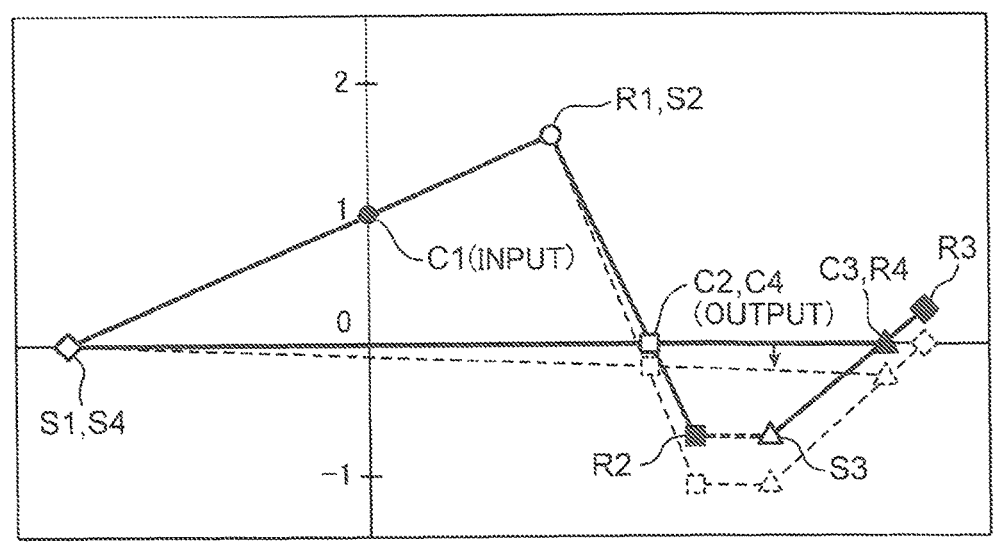
FIG. 9 is a velocity diagram of the automatic transmission when the R-range is attained.

Further, the aforementioned matter is described in detail using the velocity diagrams of FIG. 8 and FIG. 9. FIG. 8 is a velocity diagram when the first gear position in the D-range is attained. FIG. 9 is a velocity diagram when the R-range is attained. The velocity diagrams of FIG. 8 and FIG. 9 are graphical expressions of speeds (speed ratios) of the rotary elements of each of the gear sets PG1 to PG4 when the rotational speed of the input shaft 12 is set to 1. In the embodiment, the first carrier C1 and the input shaft 12 are always connected to each other via the power transmission member 28. Therefore, the rotational speed of the first carrier C1 is always equal to the rotational speed of the input shaft 12, i.e. the speed ratio of the first carrier C1 is always 1. Further, the fourth carrier C4 and the output shaft 13 are always connected to each other, and the fourth carrier C4 and the second carrier C2 are always connected to each other via the power transmission member 26. Therefore, the rotational speeds of the second carrier C2 and the fourth carrier C4 are always equal to the rotational speed of the output shaft 13. In addition to the above, when the automatic transmission 1 is in the first gear position in the D-range (see FIG. 8), the first carrier C1 and the third sun gear S3 are mechanically connected to each other via the first clutch CL1 and the power transmission members 15 and 16 by engagement of the first clutch CL1. Therefore, the rotational speeds of the first carrier C1 and the third sun gear S3 are equal to each other. Further, when the automatic transmission 1 is in the R-range (see FIG. 9), the second ring gear R2 and the third sun gear S3 are mechanically connected to each other via the third clutch CL3 and the power transmission members 15, 16, and 17 by engagement of the third clutch CL3. Therefore, the rotational speeds of the second ring gear R2 and the third sun gear S3 are equal to each other. A thick broken line connecting the first carrier C1 and the third sun gear S3 in FIG. 8, and a thick broken line connecting the second ring gear R2 and the third sun gear S3 in FIG. 9 respectively represent that mechanical connections as described above are attained.

In FIG. 8 and FIG. 9, the velocity diagrams indicated by thick solid lines represent speeds of the rotary elements when a vehicle is stopped. Since a vehicle is stopped, the rotational speeds of the output shaft 13, and the second carrier C2 and the fourth carrier C4 which are always connected to the output shaft 13 are zero. On the other hand, the input shaft 12, and the first carrier C1 which is always connected to the input shaft 12 are rotated at a predetermined speed. In this way, rotation of the output shaft 13 is stopped while allowing rotation of the input shaft 12. This is because, as described above, slip control is performed with respect to the second brake BR2 when a vehicle is stopped. On the other hand, when a vehicle is traveling, rotation of the input shaft 12 is transmitted to the output shaft 13 by engagement of the second brake BR2, and the output shaft 13 is rotated at a predetermined speed. Thus, the velocity diagrams are changed as indicated by thin broken lines.

As is comprehensible from FIG. 8, in a state that the D-range is attained, the third sun gear S3 is rotated in the plus direction on the vertical axis of the graph, regardless of whether a vehicle is stopped or a vehicle is traveling. On the other hand, in a state that the R-range is attained, as illustrated in FIG. 9, the third sun gear S3 is rotated in the minus direction on the vertical axis of the graph, in other words, in a direction opposite to the direction when the D-range is attained, regardless of whether a vehicle is stopped or a vehicle is traveling. This makes it possible to determine whether the D-range or the R-range is attained on the basis of a rotational direction of the third sun gear S3 when the range of the automatic transmission 1 is neither the P-range nor the N-range. Note that the power transmission member 15 is connected to the third sun gear S3, and the third sun gear S3 is integrally rotated with the power transmission member 15. Therefore, by specifying the rotational direction of the power transmission member 15 in place of the third sun gear S3, it is possible to perform the same determination as described above on the basis of a rotational direction of the power transmission member 15.

In view of the above, in Steps ST5 to ST7 (see FIG. 5), the rotational direction of the power transmission member 15 is specified with use of a detection value from the internal rotation sensor SN2, namely, it is specified in which direction i.e. the first direction or the second direction, the power transmission member 15 is rotated, and it is determined whether the D-range or the R-range is attained on the basis of the determination result. In this case, the first direction corresponds to the plus direction on the vertical axes of FIG. 8 and FIG. 9, and the second direction corresponds to the minus direction on the vertical axes of FIG. 8 and FIG. 9.

Figure 6:
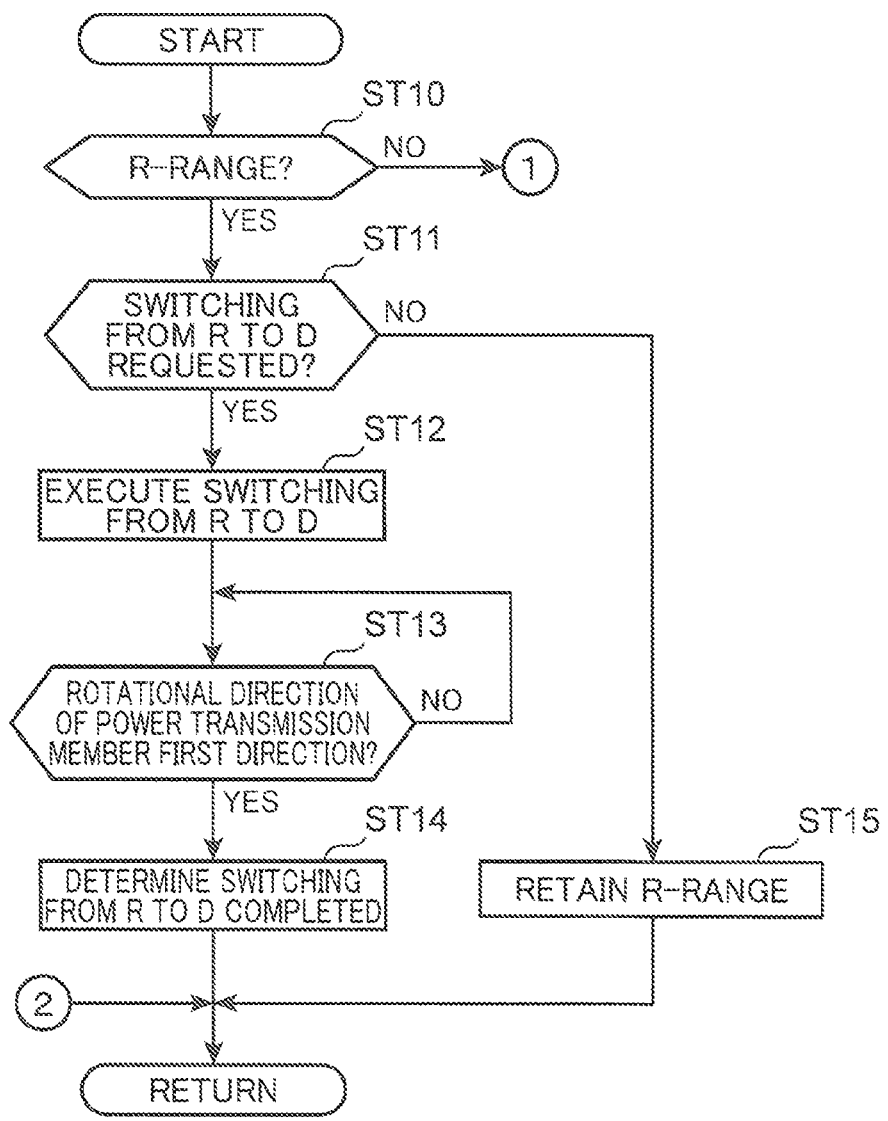
FIG. 6 is a flowchart illustrating a specific control example when the range is switched from the R-range (reverse range) to the D-range (forward range)
Figure 7:
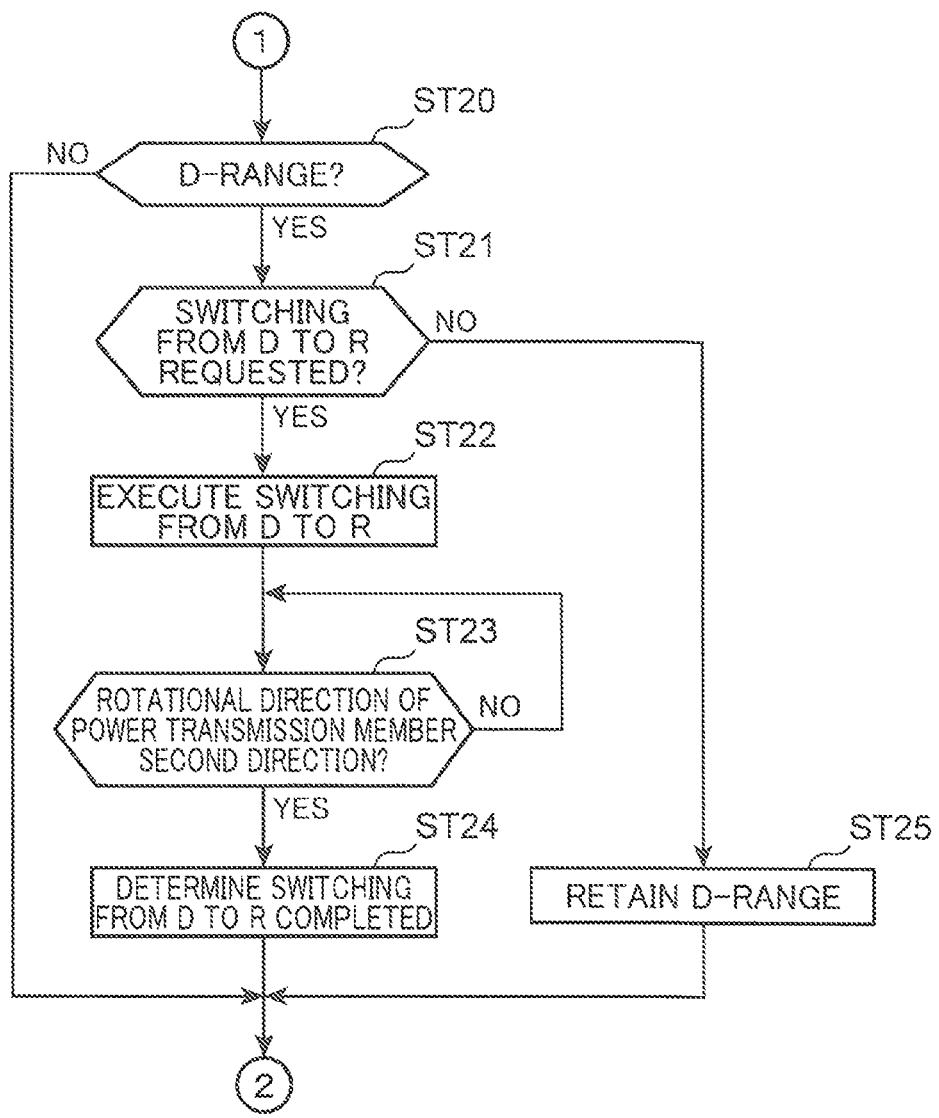
FIG. 7 is a flowchart illustrating a specific control example when the range is switched from the D-range (forward range) to the R-range (reverse range)

Next, a control operation when an operation of switching the range of the automatic transmission 1 between the D-range and the R-range is performed is described. FIG. 6 and FIG. 7 are flowcharts for determining a timing (switching completion timing) at which the range is actually switched when an operation of switching the range of the automatic transmission 1 between the D-range and the R-range is performed. Note that the control illustrated in the flowchart is always performed concurrently with the flowchart of FIG. 5.

When the control illustrated in the flowchart of FIG. 6 is started, the controller 60 determines whether or not the current range of the automatic transmission 1 is the R-range on the basis of a result on the range determination control of FIG. 5 (Step ST10).

When the determination result in Step ST10 is YES, and it is confirmed that the current range is the R-range, the controller 60 determines whether or not there is a request for switching from the R-range to the D-range (Step ST11). Specifically, the controller 60 determines whether or not the shift lever 70 is operated from the position associated with the R-range to the position associated with the D-range on the basis of the position of the shift lever 70 to be detected by the shift position sensor SN9.

When the determination result in Step ST11 is NO, and it is confirmed that there is no request for switching from the R-range to the D-range, the controller 60 retains the current range of the automatic transmission 1 i.e. the R-range (Step ST15).

On the other hand, when the determination result in Step ST11 is YES, and it is confirmed that there is a request for switching from the R-range to the D-range, the controller 60 executes control of switching the range of the automatic transmission 1 from the R-range to the D-range (Step ST12). Specifically, the controller 60 switches the range of the automatic transmission 1 from the R-range to the D-range by controlling the first to fifth LSVs 51 to 55 in such a manner that predetermined frictional engagement elements necessary for attaining the D-range (more specifically, the first gear position in the D-range) are engaged. Note that a vehicle is substantially stopped (a vehicular speed is zero or significantly low) when the range of the automatic transmission 1 is switched from the R-range to the D-range. Therefore, in Step ST12, the first clutch CL1 and the first brake BR1 are engaged, and slip control is performed with respect to the second brake BR2 so as to attain the first gear position in the D-range while avoiding that an engine may stall (see FIG. 2).

Subsequently, the controller 60 determines whether or not the power transmission member 15 is rotated in the first direction as well as Step ST5 in FIG. 5 (Step ST13). Then, it is determined that switching from the R-range to the D-range is completed at a point of time when determination in Step ST13 is YES, namely, at a point of time when the power transmission member 15 is started to rotate in the first direction (Step ST14). Specifically, as described above, rotational directions of the power transmission member 15 (third sun gear S3) are different between the D-range and the R-range. In a state that the D-range is attained, the power transmission member 15 is rotated in the plus direction on the vertical axes of FIG. 8 and FIG. 9. Therefore, it is determined that switching to the D-range is substantially completed at a point of time when the power transmission member 15 is started to rotate in the plus direction (first direction).

The determination control as described above is also applied when an operation of switching the range of the automatic transmission 1 from the D-range to the R-range is performed (see FIG. 7). Specifically, when the flowchart illustrated in FIG. 7 is started, the controller 60 determines whether or not the current range of the automatic transmission 1 is the D-range on the basis of a result on the range determination result illustrated in FIG. 5 (Step ST20).

When the determination result in Step ST20 is YES, and it is confirmed that the current range of the automatic transmission 1 is the D-range, the controller 60 determines whether or not there is a request for switching the range of the automatic transmission 1 from the D-range to the R-range, in other words, whether or not the shift lever 70 is operated from the position associated with the D-range to the position associated with the R-range (Step ST21).

When the determination result in Step ST21 is NO, and it is confirmed that there is no request for switching from the D-range to the R-range, the controller 60 retains the current range of the automatic transmission 1 i.e. the D-range (Step ST25).

On the other hand, when the determination result in Step ST21 is YES, and it is confirmed that there is a request for switching from the D-range to the R-range, the controller 60 executes control of switching the range of the automatic transmission 1 from the D-range to the R-range (Step ST22). Specifically, the controller 60 switches the range of the automatic transmission 1 from the D-range to the R-range by controlling the first to fifth LSVs 51 to 55 in such a manner that predetermined frictional engagement elements necessary for attaining the R-range are engaged. Note that a vehicle is substantially stopped (a vehicular speed is zero or significantly low) when the range of the automatic transmission 1 is switched from the D-range to the R-range. Therefore, in Step ST22, the third clutch CL3 and the first brake BR1 are engaged, and slip control is performed with respect to the second brake BR2 so as to attain the R-range while avoiding that an engine may stall (see FIG. 2).

Subsequently, the controller 60 determines whether or not the power transmission member 15 is rotated in the second direction opposite to the first direction (Step ST23). Then, it is determined that switching from the D-range to the R-range is completed at a point of time when the determination result in Step ST23 is YES, in other words, at a point of time when the power transmission member 15 is started to rotate in the second direction (Step ST24).

(3) Advantageous Effects

As described above, in the embodiment, it is determined whether the range of the automatic transmission 1 is the D-range or the R-range on the basis of the rotational direction of the power transmission member 15. This is advantageous in performing high-precision determination on the D-range or the R-range, for which accuracy is required.

Specifically, in the embodiment, a rotational direction of a rotary element (in this example, the power transmission member 15) included in the transmission mechanism 14 of the automatic transmission 1 is actually detected with use of the internal rotation sensor SN2, and the D-range or the R-range is determined on the basis of the detected rotational direction. This is advantageous in determining the D-range or the R-range with high precision, as compared with a configuration, in which the D-range or the R-range is indirectly determined on the basis of a hydraulic pressure to be supplied to the frictional engagement elements (CL1 to CL3; BR1, BR2) of the automatic transmission 1, for instance.

For instance, when there is a defect regarding the automatic transmission 1, the D-range or the R-range may not be appropriately attained, and the R-range may be unintentionally attained, regardless that the D-range should be attained, or vice versa. In particular, in the embodiment, a so-called shift-by-wire system in which the automatic transmission 1 is controlled on the basis of an electrical signal representing an operation of the shift lever 70 is employed, and the shift lever 70 and the automatic transmission 1 are not mechanically associated with each other. Therefore, the range of the automatic transmission 1 may be unintentionally set to the D-range, regardless that the shift lever 70 is operated to a position associated with the R-range, or vice versa. Such an unexpected condition may lead to a situation that a vehicle is started in a direction opposite to a direction intended by the driver. This is not desirable in terms of safety. Therefore, determination as to whether the range of the automatic transmission 1 is the D-range or the R-range is required to be performed with high precision, as compared with determination regarding the other ranges (such as the P-range and the N-range).

According to the embodiment, in which determination on the D-range or the R-range is performed on the basis of an actual rotational direction of the power transmission member 15, it is possible to increase the precision in determining the D-range or the R-range. Thus, it is possible to sufficiently secure vehicular safety by appropriately controlling a vehicle (or an engine) on the basis of a result of the determination.

For instance, when an accelerator pedal is stepped down in a condition that the position of the shift lever 70 and the actual range of the automatic transmission 1 do not coincide with each other, it is possible to securely avoid a situation that a vehicle is started in a direction opposite to a direction intended by the driver by appropriately executing control of restricting the engine output or actuating an electrically driven parking brake. This is advantageous in enhancing vehicular safety.

Further, as illustrated in FIG. 6 and FIG. 7, in the embodiment, when there is a request for switching the range between the D-range and the R-range, in other words, when the shift lever 70 is operated between the position associated with the D-range and the position associated with the R-range, it is determined whether or not switching the range is actually completed on the basis of the rotational direction of the power transmission member 15. This makes it possible to speedily and accurately recognize a timing at which the range is switched from the D-range to the R-range, or from the R-range to the D-range. This allows for the control, which is allowed only after completion of switching is recognized, to be executed as quickly as possible. This is advantageous in improving the operability of a vehicle.

For instance, the driver may step down the accelerator pedal to drive the vehicle in a forward direction immediately after operating the shift lever 70 from the position associated with the R-range to the position associated with the D-range. On the other hand, when the shift operation of switching between the D-range and the R-range is performed, the engine output may be suppressed until completion of switching between the D-range and the R-range is recognized, in view of an aspect of enhancing vehicular safety or in view of an aspect of reducing an acceleration shock when a vehicle is started. In such a case, if a long time is required for determining that switching the range is completed, the engine output may not increase as intended, regardless that the driver steps down the accelerator pedal. This may frustrate the driver. In the embodiment, however, completion of switching from the D-range to the R-range or from the R-range to the D-range is recognized immediately after the rotational direction of the power transmission member 15 is switched. This is advantageous in avoiding occurrence of the aforementioned situation, and in improving the operability of the vehicle.

Further, in the embodiment, it is determined whether or not the P-range is attained on the basis of a hydraulic pressure to be supplied to the parking lock mechanism 30, and it is determined whether or not the N-range is attained on the basis of a hydraulic pattern of hydraulic oil to be supplied to the frictional engagement elements (CL1 to CL3; BR1, BR2) before determination on the D-range or the R-range is performed. This makes it possible to determine whether the range of the automatic transmission 1 is the D-range or the R-range after eliminating a possibility that the range is the N-range or the P-range when it is confirmed that the range is neither the N-range nor the P-range as a result of these determinations. This is advantageous in increasing the precision in determining whether the range is the D-range or the R-range.

Note that in the embodiment, the rotational direction of the power transmission member 15 which is integrally rotated with the third sun gear S3 is detected by the internal rotation sensor SN2, and it is determined whether the range is the D-range or the R-range on the basis of the detected rotational direction. Alternatively, as far as a rotary member whose rotational directions are different between the D-range and the R-range is used, it is possible to perform the same determination as described above on the basis of a rotational direction of the rotary member.

Further, in the embodiment, it is determined whether the range is the D-range or the R-range on the basis of a rotational direction of the power transmission member 15. Alternatively, a rotational speed of the power transmission member 15 may be detected with use of a sensor capable of detecting a rotational speed, and determination on the D-range or the R-range may be performed on the basis of the detected rotational speed. For instance, as illustrated in FIG. 8 and FIG. 9, at least in a state that a vehicle is stopped, the absolute values of rotational speed of the third sun gear S3 are different between the D-range and the R-range. Therefore, the absolute value of rotational speed of the power transmission member 15 which is integrally rotated with the third sun gear S3 may be detected by a sensor. Further, when the absolute value of detected rotational speed is equal to or larger than a predetermined threshold value, it is determined that the D-range is attained. When the absolute value of detected rotational speed is smaller than the threshold value, it is determined that the R-range is attained. Note that the threshold value to be used in the determination may be a value between a calculated rotational speed (absolute value) of the power transmission member 15 when the D-range is attained, and a calculated rotational speed (absolute value) of the power transmission member 15 when the R-range is attained. Further, also during traveling of a vehicle, the rotational speed of the power transmission member 15 changes in proportion to the rotational speed of the input shaft 12 that changes. In view of the above, when the range is determined on the basis of a rotational speed also during traveling of a vehicle, it is desirable that the aforementioned threshold value may be set variably according to a rotational speed of the input shaft 12.

Further, in the embodiment, it is determined whether the P-range is attained on the basis of a state of a hydraulic actuator provided in the parking lock mechanism 30. Alternatively, it may be determined whether or not the P-range is attained on the basis of a state of a member of the parking lock mechanism 30 other than the above. For instance, it may be determined whether or not the P-range is attained on the basis of a position of the lock lever 32, or on the basis of a position of a connection member which connects between the lock lever 32 and the actuator.

Further, in the embodiment, slip control is performed with respect to the second brake BR2 when a vehicle is stopped in a state that the D-range or the R-range is selected. However, as far as the second brake BR2 is in a disengagement state so that rotation of the input shaft 12 is allowed, the second brake BR2 may be brought to a released state, in other words, a state that relative rotation between friction plates is allowed and a torque is not transmitted, for instance.

Further, when a vehicle is stopped, rotation of the input shaft 12 may be allowed by disengaging one of the frictional engagement elements required to be engaged when the vehicle is started, in other words, by performing slip control or release control. For instance, a frictional engagement element other than the second brake BR2 may be disengaged.

(4) Summary of Embodiment

The following is a summary of the embodiment.

The embodiment is directed to a range determination device configured to determine a range of an automatic transmission provided with an input portion, an output portion, and a range switching mechanism which transmits rotation of the input portion to the output portion, and which is operative to switch the range of the automatic transmission between a forward range and a reverse range, in which directions of transmitting rotation from the input portion to the output portion are different from each other. The range determination device includes a rotational state detection unit which detects a rotational state of a predetermined rotary member included in the range switching mechanism; and a determination unit which determines that the forward range or the reverse range is attained on the basis of the rotational state of the rotary member detected by the rotational state detection unit.

In the range determination device having the aforementioned configuration, the rotational state of the predetermined rotary member of the range switching mechanism is actually detected. Further, it is determined whether the range is the forward range or the reverse range on the basis of the detected rotational state. This makes it possible to determine whether the range is the forward range or the reverse range with high precision, for instance, as compared with a configuration in which it is indirectly determined whether the range is the forward range or the reverse range on the basis of a hydraulic pressure to be supplied to a frictional engagement element to be driven in switching the range.

For instance, when there is a defect regarding an automatic transmission, the forward range or the reverse range may not be appropriately attained, and the reverse range may be unintentionally attained, regardless that the forward range should be attained, or vice versa. Further, the forward range and the reverse range have such a relationship that the rotational directions of an output shaft are opposite to each other. Therefore, the influence when the range is erroneously determined is serious. Determination on the forward range or the reverse range is required to be performed with high precision, as compared with determination on the other ranges.

In the range determination device, it is determined whether the range is the forward range or the reverse range on the basis of an actual rotational state of the rotary member. Therefore, it is possible to increase the precision in determining whether the range is the forward range or the reverse range. Thus, it is possible to sufficiently secure the safety by performing appropriate control based on a result of the determination.

Preferably, the determination unit may determine that one of the forward range and the reverse range is attained when the rotary member is rotated in a predetermined first direction, and the determination unit may determine that the other of the forward range and the reverse range is attained when the rotary member is rotated in a second direction opposite to the first direction.

Further, the determination unit may determine that one of the forward range and the reverse range is attained when a rotational speed of the rotary member is equal to or larger than a predetermined threshold value, and the determination unit may determine that the other of the forward range and the reverse range is attained when the rotational speed of the rotary member is smaller than the threshold value.

According to the aforementioned configuration, it is possible to securely determine whether the range is the forward range or the reverse range by a simplified method i.e. by detecting a rotational direction or a rotational speed of the rotary member.

Preferably, the input portion of the automatic transmission may be connected to an engine mounted in a vehicle. The range switching mechanism may include a plurality of frictional engagement elements to be engaged or released in order to switch a power transmission path from the input portion to the output portion, and may be controlled in such a manner that one of the frictional engagement elements required to be engaged when the vehicle is started is disengaged when the vehicle is stopped. The determination unit may execute determination on the forward range or the reverse range at least when the vehicle is stopped.

As described above, in the vehicular automatic transmission in which one of the frictional engagement elements required to be engaged when a vehicle is started is disengaged when the vehicle is stopped, the range switching mechanism necessarily has a rotary member which rotates even when the vehicle is stopped. Therefore, it is possible to precisely determine whether the range is the forward range or the reverse range when the vehicle is stopped by detecting a rotational state of the rotary member. Further, when it is confirmed that the actual range of the automatic transmission does not coincide with the position of a shift lever within the vehicle as a result of the determination, it is possible to sufficiently secure vehicular safety by appropriately controlling the vehicle (or the engine) on the basis of the determination result. For instance, when an accelerator pedal is stepped down in a condition that the aforementioned mismatching condition occurs, it is possible to securely avoid a situation that the vehicle is started in a direction opposite to a direction intended by the driver by appropriately executing control of restricting the engine output or actuating an electrically driven parking brake. This is advantageous in enhancing vehicular safety.

In the aforementioned configuration, more preferably, when the determination unit receives a request for switching the range between the forward range and the reverse range, the determination unit may determine whether or not the switching is completed on the basis of the rotational state of the rotary member detected by the rotational state detection unit.

According to the aforementioned configuration, it is possible to speedily and accurately recognize a timing at which the range is switched from the forward range to the reverse range, or from the reverse range to the forward range. This allows for the control, which is allowed only after completion of switching is recognized, to be executed as quickly as possible. This is advantageous in improving the operability of a vehicle.

For instance, the driver may step down the accelerator pedal to drive the vehicle in a forward direction immediately after operating the shift lever from the position associated with the reverse range to the position associated with the forward range. On the other hand, when the shift operation of switching between the forward range and the reverse range is performed, the engine output may be suppressed until completion of switching between the forward range and the reverse range is recognized, in view of an aspect of enhancing vehicular safety or in view of an aspect of reducing an acceleration shock when a vehicle is started. In such a case, if a long time is required for determining that switching the range is completed, the engine output may not increase as intended, regardless that the driver steps down the accelerator pedal. This may frustrate the driver. In the aforementioned configuration, however, completion of switching from the forward range to the reverse range or from the reverse range to the forward range is recognized as quickly as possible on the basis of a rotational state of the rotary member. This is advantageous in avoiding occurrence of the aforementioned situation, and in improving the operability of a vehicle.

Preferably, the range switching mechanism may include the plurality of frictional engagement elements to be engaged or released according to supply or discharge of a predetermined hydraulic medium, and may be operative to switch the range between the forward range, the reverse range, and a neutral range in which rotation of the input portion is not transmitted to the output portion in response to engagement or release of each of the frictional engagement elements. The automatic transmission may include a pressure detection unit which detects a pressure of the hydraulic medium to be supplied to each of the frictional engagement elements. The determination unit may determine whether or not the neutral range is attained on the basis of information detected by the pressure detection unit.

Further, the automatic transmission may include a parking lock mechanism which locks rotation of the output portion. The determination unit may determine whether or not a parking range in which rotation of the output portion is locked is attained on the basis of a state of the parking lock mechanism.

According to the aforementioned configuration, it is possible to determine whether the range is the forward range or the reverse range after eliminating a possibility that the range is the neutral range or the parking range. This makes it possible to increase the precision in determining whether the range is the forward range or the reverse range.

The embodiment is also directed to a range determination device configured to determine a range of an automatic transmission provided with an input portion, an output portion, and a range switching mechanism which transmits rotation of the input portion to the output portion, and which is operative to switch the range of the automatic transmission between a forward range and a reverse range, in which directions of transmitting rotation from the input portion to the output portion are different from each other. The range determination device includes a rotational state detection unit which detects a rotational state of a predetermined rotary member included in the range switching mechanism; and a determination unit which determines, when receiving a request for switching the range between the forward range and the reverse range, whether or not the switching is completed on the basis of the rotational state of the rotary member detected by the rotational state detection unit.

In the range determination device having the aforementioned configuration, it is possible to speedily and accurately recognize a timing at which the range is switched from the forward range to the reverse range, or from the reverse range to the forward range. This is advantageous in improving the operability of a vehicle as described above.

This application is based on Japanese Patent Application No. 2016-002496 filed in Japan Patent Office on Jan. 8, 2016, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A range determination device configured to determine a range of an automatic transmission provided with an input portion, an output portion, and a range switching mechanism which transmits rotation of the input portion to the output portion, and which is operative to switch the range of the automatic transmission between a forward range and a reverse range, in which directions of transmitting rotation from the input portion to the output portion are different from each other, the range determination device comprising:
    a rotational state detection unit which detects a rotational state of a predetermined rotary member included in the range switching mechanism; and
    a determination unit which determines that the forward range or the reverse range is attained on the basis of the rotational state of the rotary member detected by the rotational state detection unit, wherein
    the determination unit determines that one of the forward range and the reverse range is attained when the rotary member is rotated in a predetermined first direction, and determines that the other of the forward range and the reverse range is attained when the rotary member is rotated in a second direction opposite to the first direction,
    the input portion of the automatic transmission is connected to an engine mounted in a vehicle,
    the range switching mechanism includes a plurality of frictional engagement elements to be engaged or released in order to switch a power transmission path from the input portion to the output portion, and is controlled in such a manner that one of the frictional engagement elements required to be engaged when the vehicle is started is disengaged when the vehicle is stopped, and
    the determination unit executes determination on the forward range or the reverse range at least when the vehicle is stopped.

2. The range determination device for an automatic transmission according to claim 1, wherein
    when the determination unit receives a request for switching the range between the forward range and the reverse range, the determination unit determines whether or not the switching is completed on the basis of the rotational state of the rotary member detected by the rotational state detection unit.

3. The range determination device for an automatic transmission according to claim 2, wherein
    the range switching mechanism includes the plurality of frictional engagement elements to be engaged or released according to supply or discharge of a predetermined hydraulic medium, and is operative to switch the range between the forward range, the reverse range, and a neutral range in which rotation of the input portion is not transmitted to the output portion in response to engagement or release of each of the frictional engagement elements,
    the automatic transmission includes a pressure detection unit which detects a pressure of the hydraulic medium to be supplied to each of the frictional engagement elements, and
    the determination unit determines whether or not the neutral range is attained on the basis of information detected by the pressure detection unit.

4. The range determination device for an automatic transmission according to claim 3, wherein
    the automatic transmission includes a parking lock mechanism which locks rotation of the output portion, and
    the determination unit determines whether or not a parking range in which rotation of the output portion is locked is attained on the basis of a state of the parking lock mechanism.

5. A range determination device configured to determine a range of an automatic transmission provided with an input portion, an output portion, and a range switching mechanism which transmits rotation of the input portion to the output portion, and which is operative to switch the range of the automatic transmission between a forward range and a reverse range, in which directions of transmitting rotation from the input portion to the output portion are different from each other, the range determination device comprising:
    a rotational state detection unit which detects a rotational state of a predetermined rotary member included in the range switching mechanism; and
    a determination unit which determines that the forward range or the reverse range is attained on the basis of the rotational state of the rotary member detected by the rotational state detection unit,
    wherein the determination unit determines that one of the forward range and the reverse range is attained when a rotational speed of the rotary member is equal to or larger than a predetermined threshold value.

6. The range determination device for an automatic transmission according to claim 5, wherein
    the determination unit determines that the other of the forward range and the reverse range is attained when the rotational speed of the rotary member is smaller than the threshold value.

7. The range determination device for an automatic transmission according to claim 6, wherein
    the input portion of the automatic transmission is connected to an engine mounted in a vehicle,
    the range switching mechanism includes a plurality of frictional engagement elements to be engaged or released in order to switch a power transmission path from the input portion to the output portion, and is controlled in such a manner that one of the frictional engagement elements required to be engaged when the vehicle is started is disengaged when the vehicle is stopped, and
    the determination unit executes determination on the forward range or the reverse range at least when the vehicle is stopped.

8. The range determination device for an automatic transmission according to claim 7, wherein
    when the determination unit receives a request for switching the range between the forward range and the reverse range, the determination unit determines whether or not the switching is completed on the basis of the rotational state of the rotary member detected by the rotational state detection unit.

9. The range determination device for an automatic transmission according to claim 8, wherein the range switching mechanism includes the plurality of frictional engagement elements to be engaged or released according to supply or discharge of a predetermined hydraulic medium, and is operative to switch the range between the forward range, the reverse range, and a neutral range in which rotation of the input portion is not transmitted to the output portion in response to engagement or release of each of the frictional engagement elements, the automatic transmission includes a pressure detection unit which detects a pressure of the hydraulic medium to be supplied to each of the frictional engagement elements, and the determination unit determines whether or not the neutral range is attained on the basis of information detected by the pressure detection unit.

10. The range determination device for an automatic transmission according to claim 9, wherein
the automatic transmission includes a parking lock mechanism which locks rotation of the output portion, and
the determination unit determines whether or not a parking range in which rotation of the output portion is locked is attained on the basis of a state of the parking lock mechanism.

11. A range determination device configured to determine a range of an automatic transmission provided with an input portion, an output portion, and a range switching mechanism which transmits rotation of the input portion to the output portion, and which is operative to switch the range of the automatic transmission between a forward range and a reverse range, in which directions of transmitting rotation from the input portion to the output portion are different from each other, the range determination device comprising:
a rotational state detection unit which detects a rotational state of a predetermined rotary member included in the range switching mechanism; and
a determination unit which determines that the forward range or the reverse range is attained on the basis of the rotational state of the rotary member detected by the rotational state detection unit,
wherein the range switching mechanism includes a plurality of frictional engagement elements to be engaged or released according to supply or discharge of a predetermined hydraulic medium, and is operative to switch the range between the forward range, the reverse range, and a neutral range in which rotation of the input portion is not transmitted to the output portion in response to engagement or release of each of the frictional engagement elements,
the automatic transmission includes a pressure detection unit which detects a pressure of the hydraulic medium to be supplied to each of the frictional engagement elements, and
the determination unit determines whether or not the neutral range is attained on the basis of information detected by the pressure detection unit.

\* \* \* \* \*